United States Patent [19]
Hoglund

[11] 3,797,957
[45] Mar. 19, 1974

[54] APPARATUS FOR SIMULTANEOUSLY DRILLING AND TAPPING A PLURALITY OF WORK PIECES AT EACH OF A PLURALITY OF POSITIONS

[75] Inventor: Nils Hoglund, Short Hills, N.J.

[73] Assignee: Tri-Ordinate Corporation, Berkeley Heights, N.J.

[22] Filed: Apr. 26, 1972

[21] Appl. No.: 247,573

Related U.S. Application Data

[62] Division of Ser. No. 118,218, Feb. 24, 1971, Pat. No. 3,733,142, which is a division of Ser. No. 763,043, Feb. 24, 1971, abandoned.

[52] U.S. Cl............... 408/44, 10/128, 29/38 C, 408/71
[51] Int. Cl............................. B23b 39/20
[58] Field of Search............ 408/43, 44, 49, 50, 53, 408/70, 71; 29/38 C; 10/128, 129, 130

[56] References Cited
UNITED STATES PATENTS

1,529,267   3/1925   Myers .................... 29/38 C
3,336,823   8/1967   Bonzi .................... 408/71

Primary Examiner—Francis S. Husar

[57] ABSTRACT

The apparatus, intended primarily for simultaneously drilling and tapping a plurality of work pieces at each of a plurality of working positions includes an annular table supporting a plurality of tapping and drilling assemblies at a plurality of spaced working positions. Rotably mounted within the annular table support is a turret having a plurality of radial arms on which are supported retractible work supporting shuttles movable toward and from working positions adjacent the tapping and drilling assemblies mounted on the annular table. Means are provided for rotating the turret to successive working positions. A novel clamp and positioning means are mounted on the shuttles for holding and accurately positioning a work supporting cartridge. Novel multiple spindle tapping and drilling assemblies permit tapping and drilling from different angles, simultaneously of a plurality of rigidly held work pieces mounted on the shuttles.

2 Claims, 13 Drawing Figures

APPARATUS FOR SIMULTANEOUSLY DRILLING AND TAPPING A PLURALITY OF WORK PIECES AT EACH OF A PLURALITY OF POSITIONS

This is a division, of application Ser. No. 118,218 (now U.S. Pat. No. 3,733,142) filed Feb. 24, 1971 which is, in turn, a divisional of Ser. No. 763,043, now abandoned.

BACKGROUND OF THE INVENTION

Present equipment such as in line equipment is not normally designed to process at one working station more than one work piece nor generally to perform more than one operation at each working station. In line equipment requires much space to accomodate the different working positions. A work piece has to be moved manually from the last working position for further processing or packaging. Registering a work piece with its working position is difficult. Link chains carrying the work holder of fixture which chains are usually used on in line equipment have stretch and wear and thus particularly where extreme accuracies are required in line equipment is not satisfactory. Turret machines presently available have very complicated mechanisms to carry the work pieces to a working position and are incapable of performing multiple operations on a plurality of work pieces in a single working position. Equipment for performing working operations from all sides; that is from all sides of the work piece as well as the top and bottom without rotating the work piece from a fixed position in a fixture have not heretofore been available.

SUMMARY OF THE INVENTION

The apparatus which is capable of simultaneously drilling and tapping a plurality of work pieces at each of a plurality of work positions includes an annularly shaped supporting table. This table provides a work loading position and supports a plurality of spaced drilling and tapping assemblies at spaced working positions there around. A rotatable work supporting turret is positioned centrally of the annular tool assembly supporting table. It is provided with a plurality of radially directed slide guides.

Slidably mounted on the guides are retractable shuttles which can be moved into work positions adjacent the tool assemblies when the turret is indexed to successive working positions. The work pieces are secured to cartridges or fixtures which are releasably clamped to the shuttles. Each cartridge supports a plurality of work pieces. The clamps are automatically released at the discharge position when all operations are completed on the work pieces. Means on the shuttles and on the annular table contact the cartridge for very accurately positioning the work pieces.

Novel multiple tool drilling assembleys make it possible to side tap work pieces where the directions of drilling may be done horizontally at angles to each other. A plurality of spindles parallel to each other are carried in a common housing and are offset successively. A common drive rotates all spindles at the same speed of rotation. Other means advance the tools quickly to working position and retract them rapidly after drilling operations are completed.

The multiple tool tapping assemblies having some of the features of the drilling tool assemblies include means for accurately and rapidly positioning the bank of tapping tools against the work pieces for expediting tapping operations.

The timing of indexing is such that both the drilling and tapping operations at all stations are completed and the shuttles retracted before indexing takes place.

The movement of the drilling assemblies and the tapping assemblies are controlled by circuits which are controlled by trippers and switches responsive to the movement of the assemblies.

This Application is a division of my Application, Ser. No. 763,043, filed Aug. 9, 1968.

DESCRIPTION OF DRAWINGS

Referring to the drawings.

DESCRIPTION OF THE PREFERRED EMBODIMENT

Figure 1A:
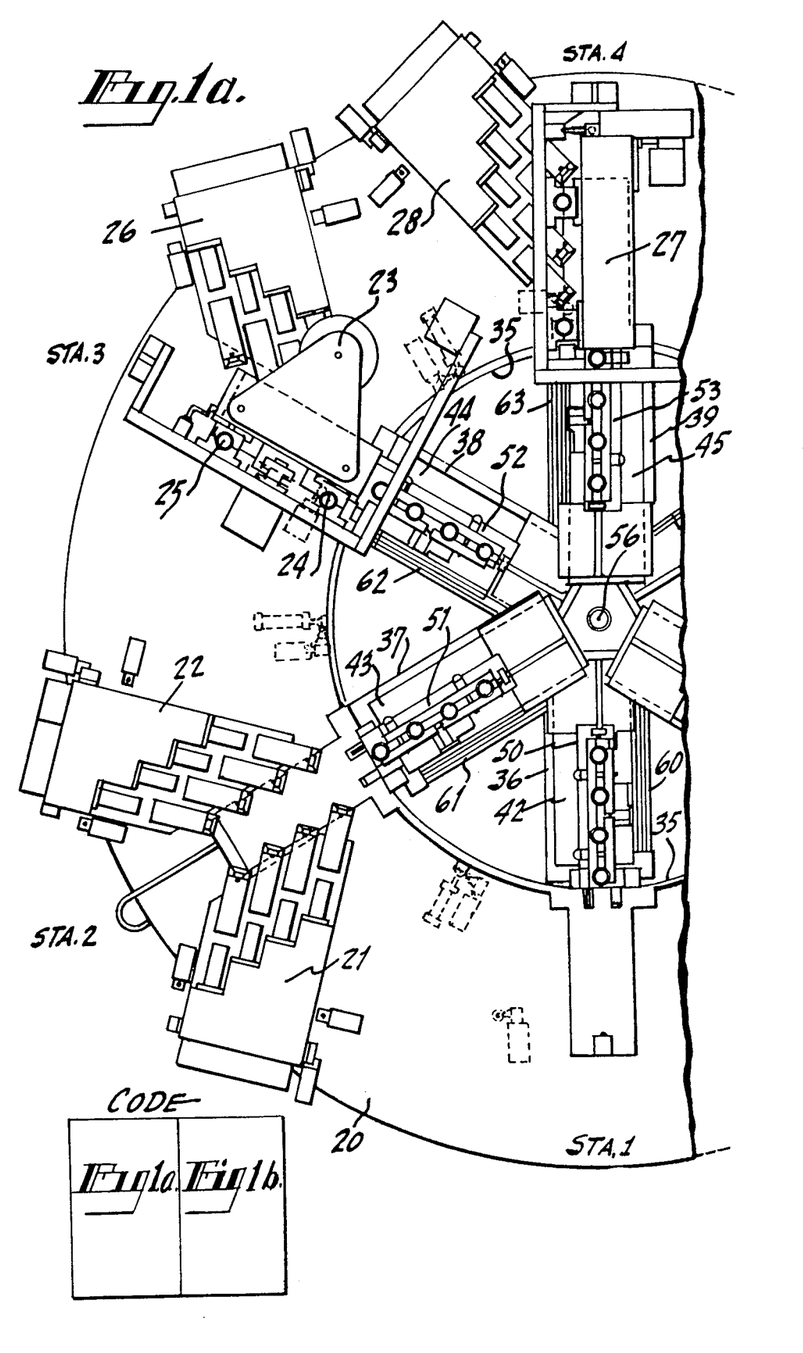
FIGS. 1a and 1b show a plan view of a complete machine assembly incorporating my invention.
Figure 1B:
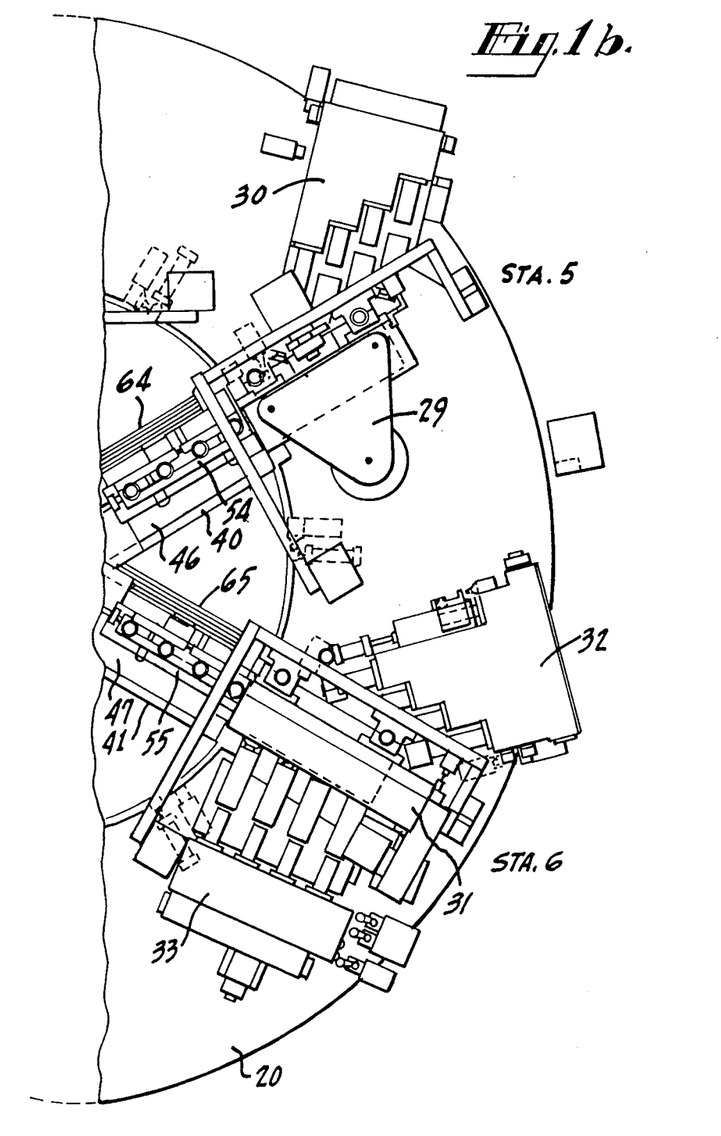
Figure 2:
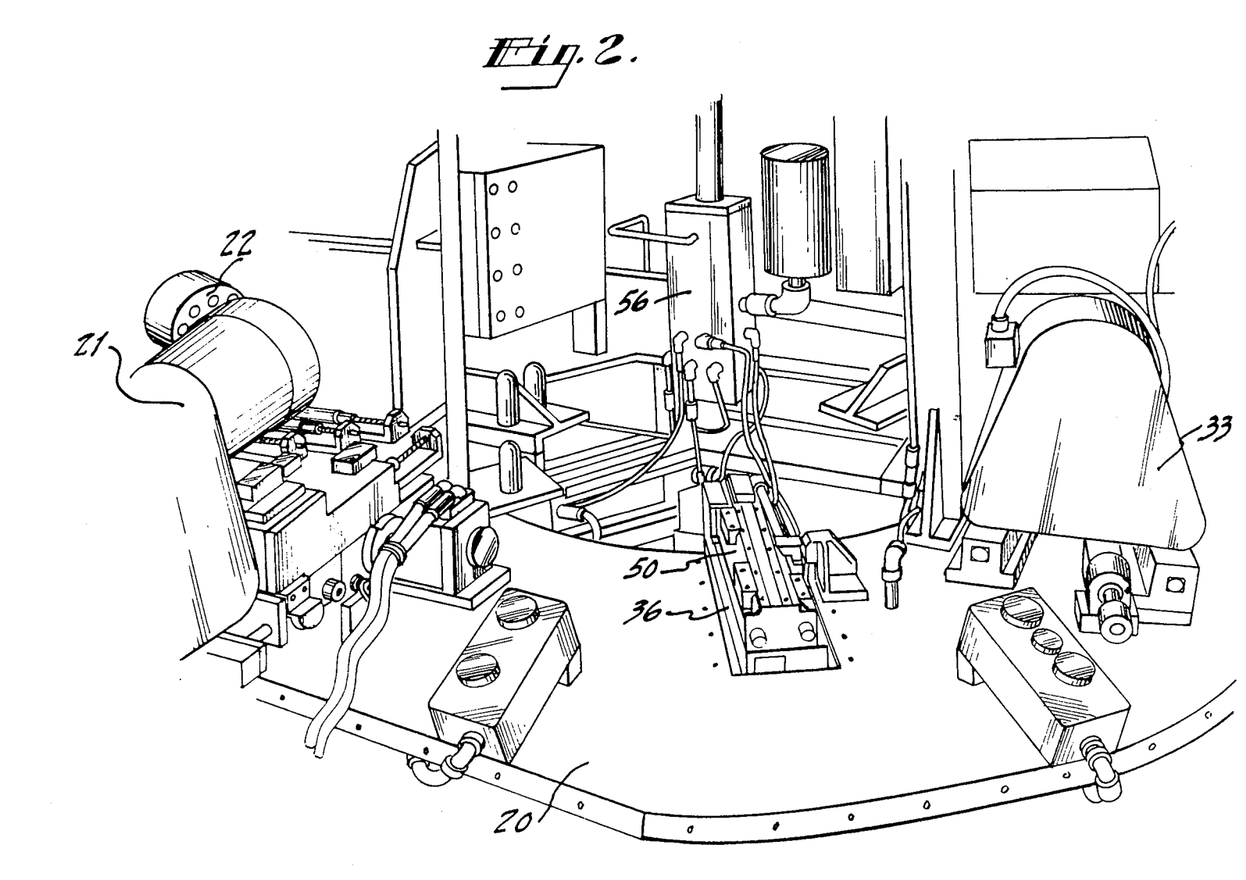
FIG. 2 is a partial perspective of the apparatus shown in FIG. 1 showing details of construction.

Referring to FIGS. 1 and 2, one form of apparatus made according to my invention includes an annular tool assembly supporting table 20. There are six positions or stations on the table, but more or less could be provided.

At station 1 the shuttles are loaded with the work filled cartridge and also unloaded after all operations are completed.

At station 2, there are provided two banks or drilling assemblies 21 and 22 which will be described in greater detail below. It will be noted that the spindles are mounted at an angle to each other and to the center line passing through the work pieces for side drilling. One set of drills completes its drilling operation before the second set begins operations to prevent drills contacting each other particularly if small work pieces are involved.

At station 3 vertical and horizontal drilling operations take place. Drilling assembly 23 is mounted for vertical movement on guides or ways 24 and 25. The other drilling assembly 26 provides for horizontal drilling.

At station 4, the tapping assembly 27 taps from the top and the drilling assembly 28 drills from the side.

At station 5 the work pieces are drilled from the top by assembly 29, and from the side by the drill assembly 30. Reaming can also be done instead of drilling.

At station 6, the last working position, tapping is done from the top by tapping assembly 31, horizontally by tapping assembly 32, and drilling is done from the side by drilling assembly 33.

Rotatably mounted within the central opening of the annular table 20, is the turret 35, provided with the radially directed work supporting slide guides 36, 37, 38, 39, 40 and 41 each of which supports a shuttle 42, 43, 44, 45, 46 and 47. These shuttles support and have clamped thereon during working operations work loaded cartridges 50, 51, 52, 53, 54 and 55. These shuttles and cartridges are described and claimed in a copending application. An air manifold 56 provides the air for operating air cylinders 60, 61, 62, 63, 64 and 65 which function to move the shuttles into work operating positions.

Switches and tripping mechanisms for controlling operation of the drilling assemblies and tapping assemblies will be described below.

DRILLING ASSEMBLIES

The drilling spindle assembly comprises two major subassemblies relatively movable with respect to each other. Both are slidably mounted on the same base. One sub-assembly includes the drill bushings which are rapidly advanced into working position closely adjacent the work pieces and then remain stationary. The drilling spindle sub-assembly includes the spindles and drills and is moved forward with the bushing subassembly initially. When the bushing sub-assembly comes to rest, a rotating cam and a contacting follower element come into operation to advance the drills. A driving motor connected to drive the drills is energized when the bushing sub-assembly reaches its working position. After the drilling operations are completed the entire drill spindle assembly is retracted. These operations are controlled by circuits operated by properly placed switches and trippers or dogs.

Referring now to FIGS. 3, 4, 5, 6 and 7, the assembly, for example 21 supported on the annular table 20, includes a base 70, supporting a pair of shafts or supporting guides 71 and 72. The drill bushings 73, 74, 75 and 76 are mounted on a bushing plate or slide support 77 slidably supported on the guide 71 and 72 by a pair of ball bushing blocks 78 and 79 being shown.

Figure 4:
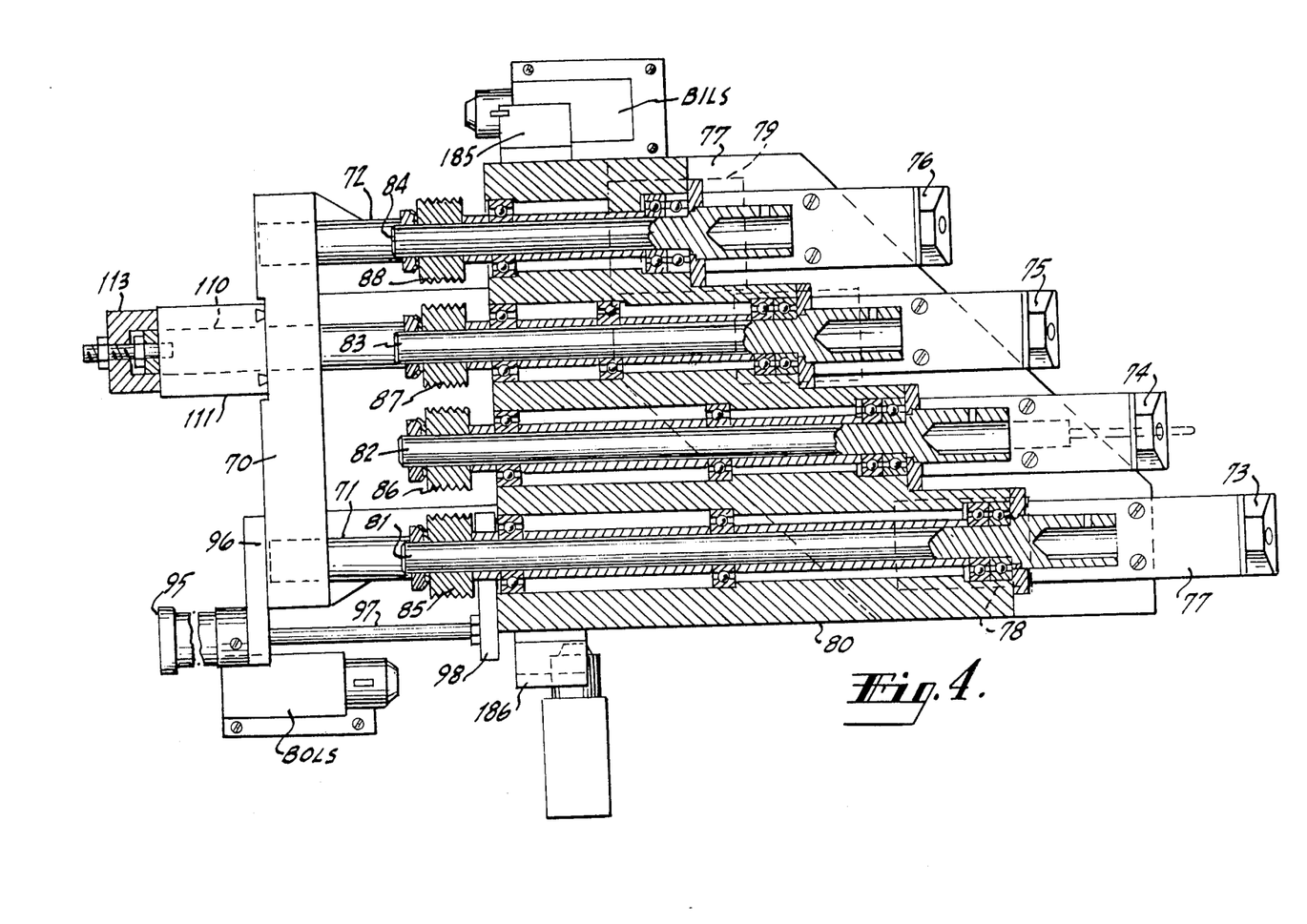
FIG. 4 is a section taken along the line 4—4 of FIG. 3.

A housing 80 supports the drill spindles 81, 82, 83 and 84 in ball bearing assemblies as shown (FIG. 4). The spindles are provided with the drive pulleys 85, 86, 87 and 88. These spindles are driven by motor 89 by means of belt 90 which engages the drive pulleys 85, 86, 87 and 88 as well as idler pulleys 90, 91 and 92.

Figure 3:
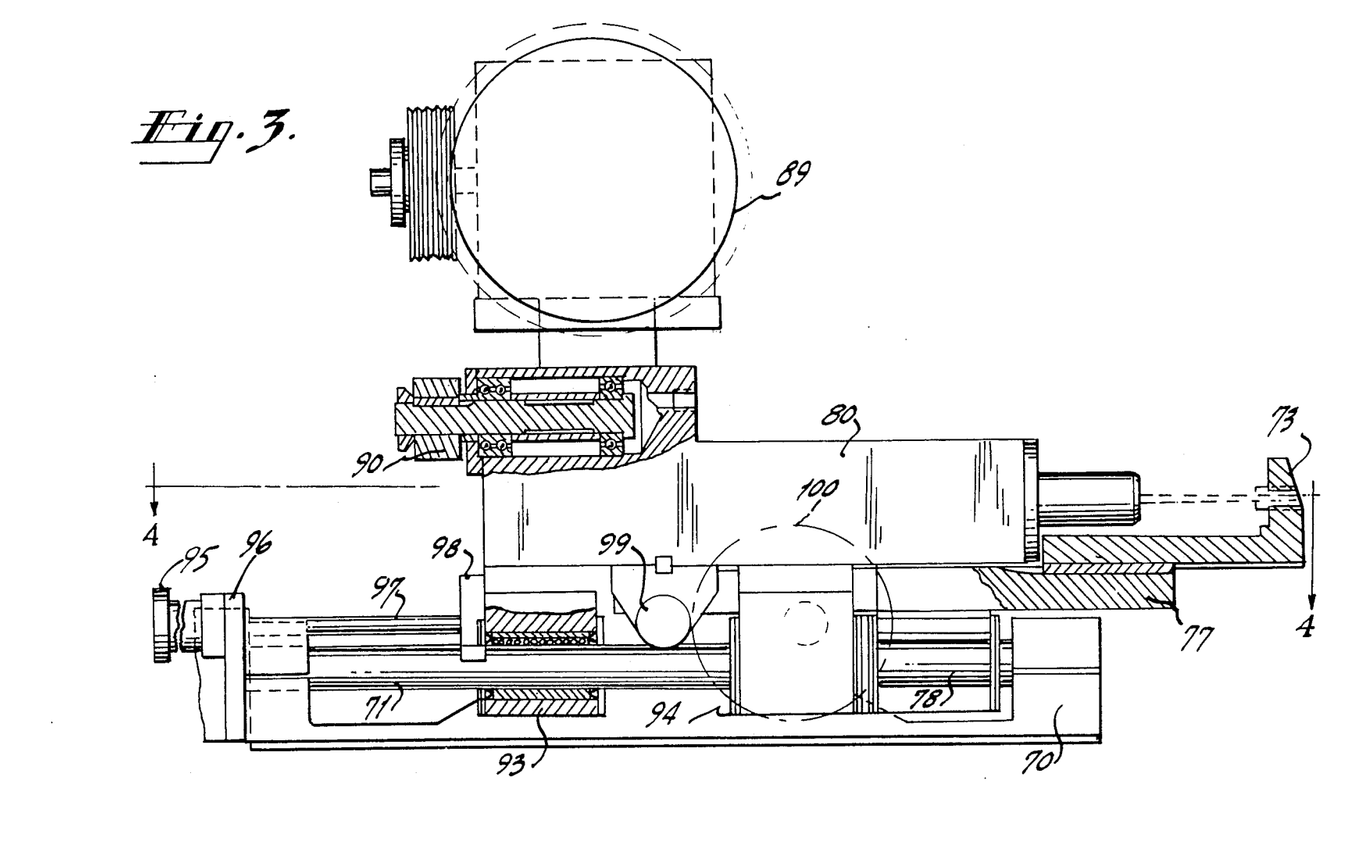
FIG. 3 is a side elevation partially in section showing details of construction of a multiple drill assembly made according to my invention.

The housing 80 is slidably supported on guides 71 and 72 by means of four ball bearing bushing blocks two of which 93 and 94 are mounted on guide 71. The other two on guide 72 are not shown (FIG. 3). Thus it will be seen that the bushing plate 77 and housing 80 are independently slidable on the guides 71 and 72.

The bushing mounting plate 77 and the spindle housing 80 are moved toward the work piece together by means of a hydraulic cylinder. When the bushings are in their work position further movements toward the work pieces is stopped as will be described below. This movement toward the work position is made rapidly. At this point a cam which contacts a follower on the spindle housing 80, is caused to rotate. The spindle housing is moved toward the work pieces for causing the drills to move into the work pieces. When drilling operations are completed the drills and bushings are automatically retracted.

The mechanism for advancing the bushing and drill assembly rapidly to working position includes (FIGS. 3, 4 and 5) a hydraulic cylinder 95. The cylinder is fastened to the base 70 by means of bracket 96. The piston rod 97 is connected to the drill housing 80 by a block 98. When the piston is energized to move the housing to the right (FIGS. 3 and 4) the follower 99 fixed to the housing 80 comes in contact with a high spot on the cam 100 attached to the driving shaft of driving motor 101. At this point motor 101 is energized causing the cam 100 to rotate. Since hydraulic cylinder biases the follower 99 against the cam 100, because of the cam shape the drill housing moves to the right and the drills advance through the bushings to perform drilling operations. Upon completion of drilling the drills are retracted and the drill housing 80 and bushing plate 77 are returned to these initial positions. The drills are fed in and out slowly.

To precisely position the bushings at their forward working position, there is attached to the bushing mounting plate 77, a rod 110 slidable through a block 111 fixed to base 70. Fixed to rod 110 is a screw 112, cooperating with a cup shaped stop nut 113. This stop nut upon engagement with block 111 prevents further movement of the busing mounting plate toward the work pieces. The limiting position of the bushing plate can be varied by repositioning stop nut 113 on screw 112. This arrangement permits minute and accurate positioning of the bushing. As will be described hydraulic piston 95 continues to bias the drill housing 80 to the right (FIG. 3) maintaining follower 99 against cam 100 which on rotating presents a shorter radius to the follower so that the drills can move into the work piece.

Figures 6, 8:
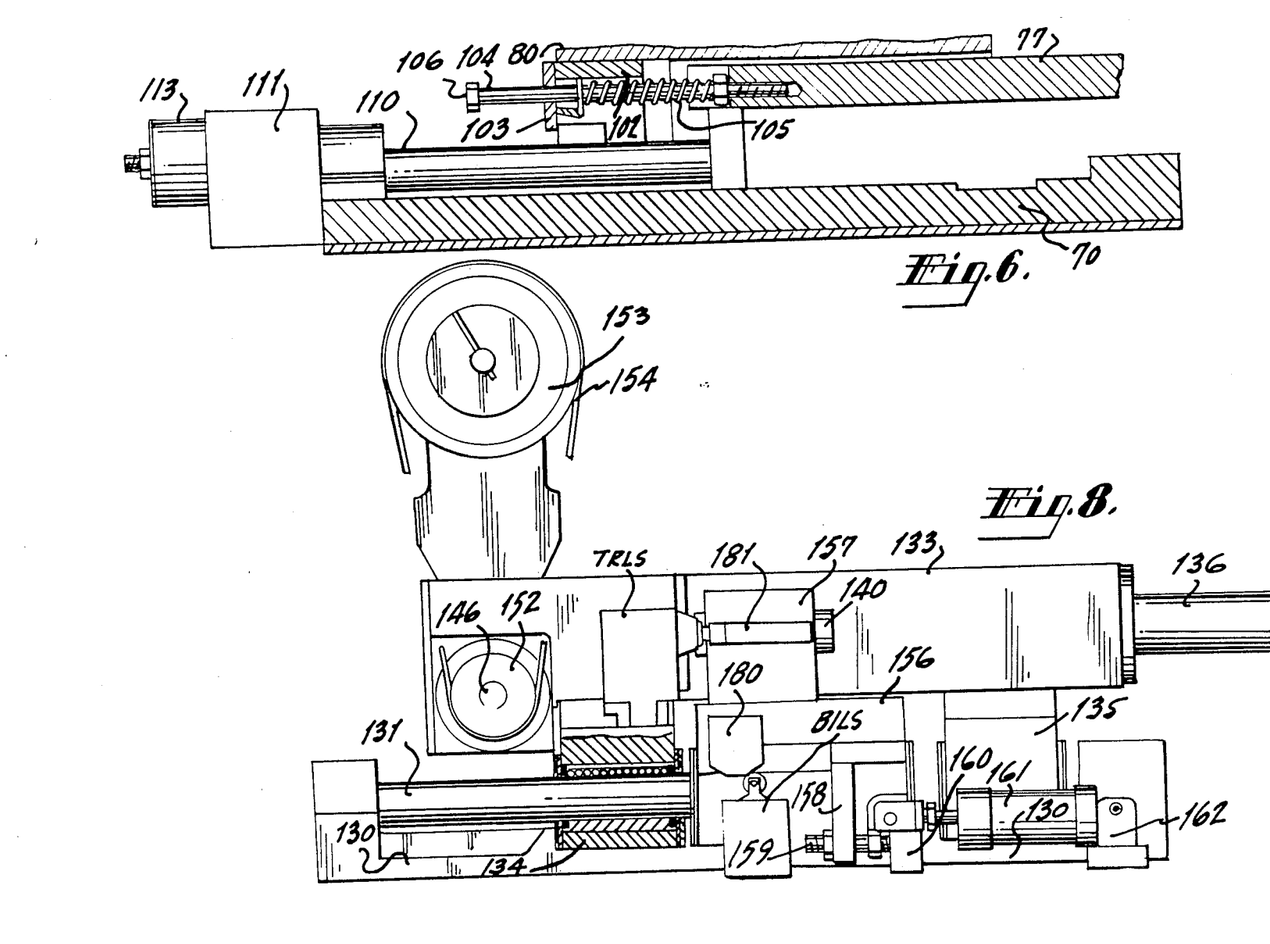
FIG. 6 is a section taken along line 6—6 of FIG. 5 showing details of the retractor.
FIG. 8 is a side elevation of the multiple tapping assembly made according to my invention and partially in section to show details of construction.
Figure 7:
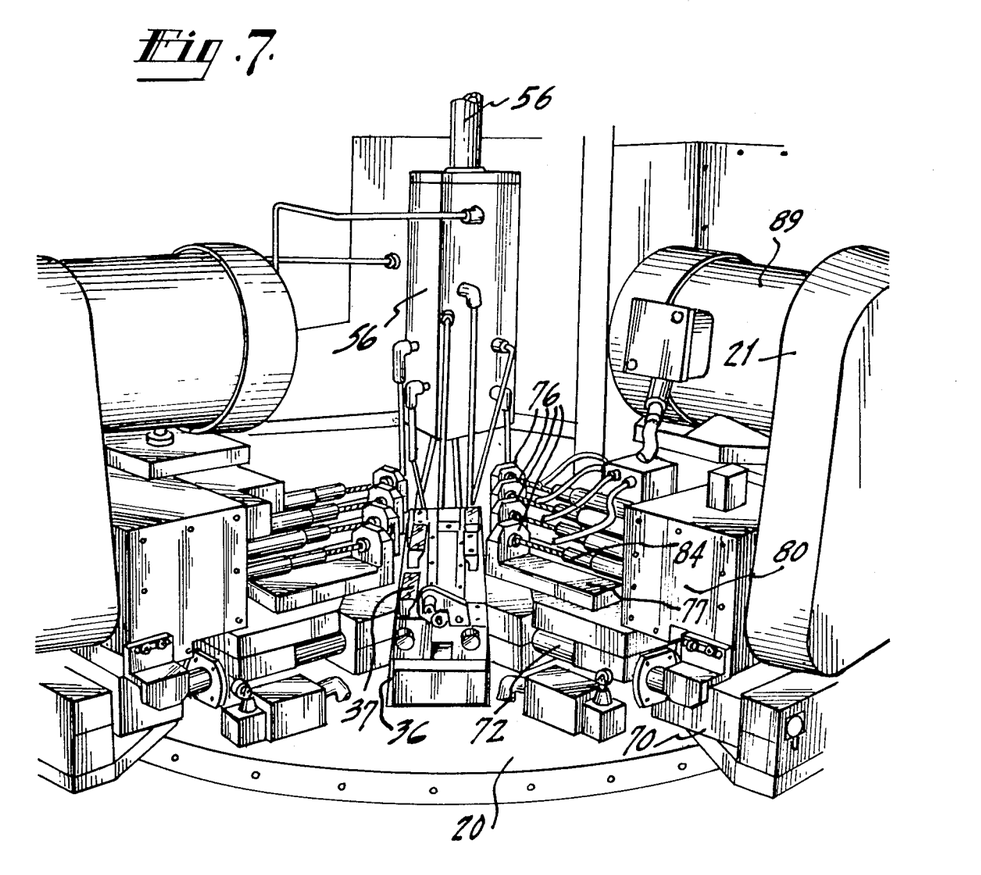
FIG. 7 is a perspective of a pair of drill assemblies shown at Station 2 of the complete assembly with a shuttle in working position.

Means are provided on housing 80 for retracting the bushing plate 77 when the housing is retracted to its non-working position. As shown in FIG. 6, a bracket 102 having an apertured plate 103 is attached to housing 80. A rod 104 passes slidably through plate 103 and is secured to the bushing plate 77. A compression spring 105 is mounted on the rod or spring guide 104. When forward movement of the bushing plate is stopped by stop nut 113, housing 80 can continue forward movement relative to plate 77, spring 105 being compressed and holding bushing plate forward. When the housing 80 is retracted plate 103 engages the head 106 of rod 104 retracting bushing plate 77.

TAPPING ASSEMBLIES

The tapping assembly includes a slide housing rotatably supporting a plurality of tapping spindles and a rotatable lead screw all driven from a common drive. The housing is slidably supported on a pair of case shafts or guides mounted on a base. A slide mounted on one of the guides has fixed thereto and supports a lead screw nut engaging the lead screw on the housing. A hydraulic cylinder mounted on the base is connected to the lead screw nut supporting slide and controls rapid movement toward and from the work position of the housing slide to position the tappers in their operating position. The lead screw then causes feeding of the plurality of tappers into the work pieces.

Figure 9:
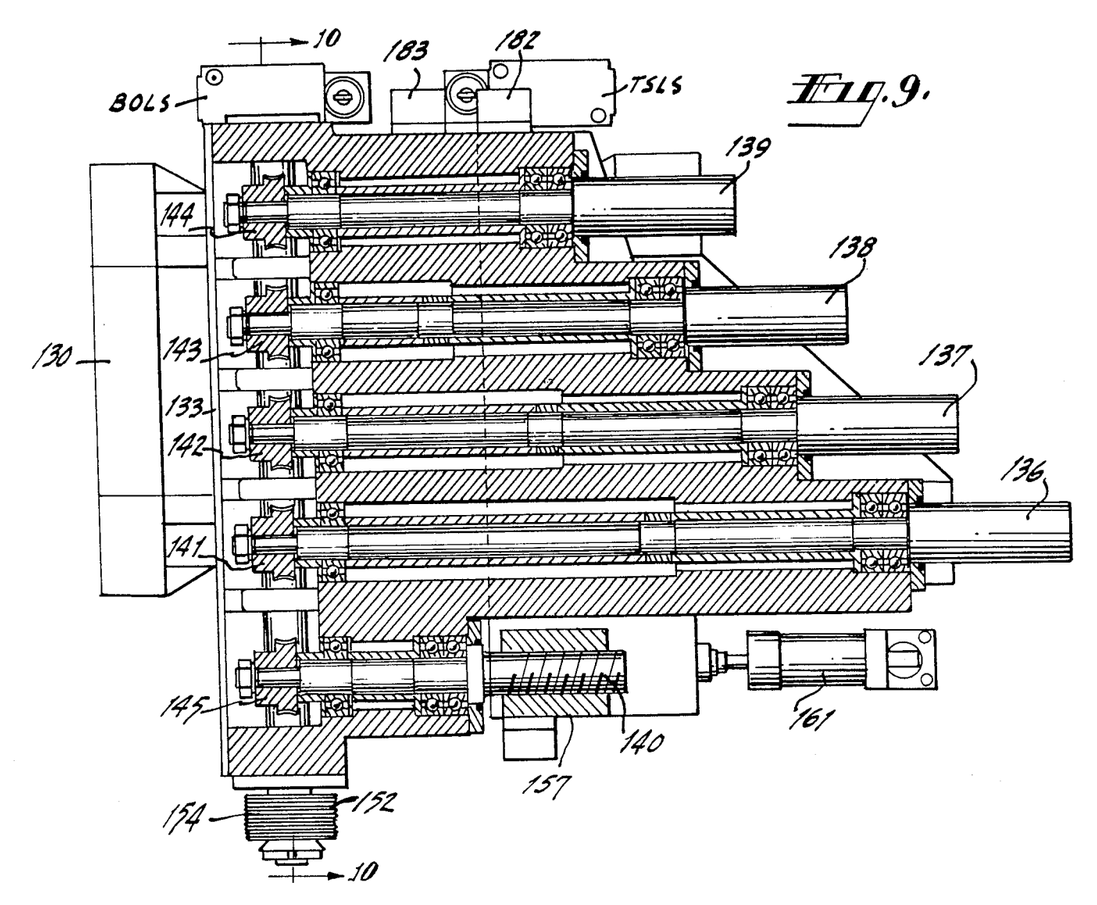
FIG. 9 is a horizontal section taken along the line 9—9 of FIG. 10.
Figure 10:
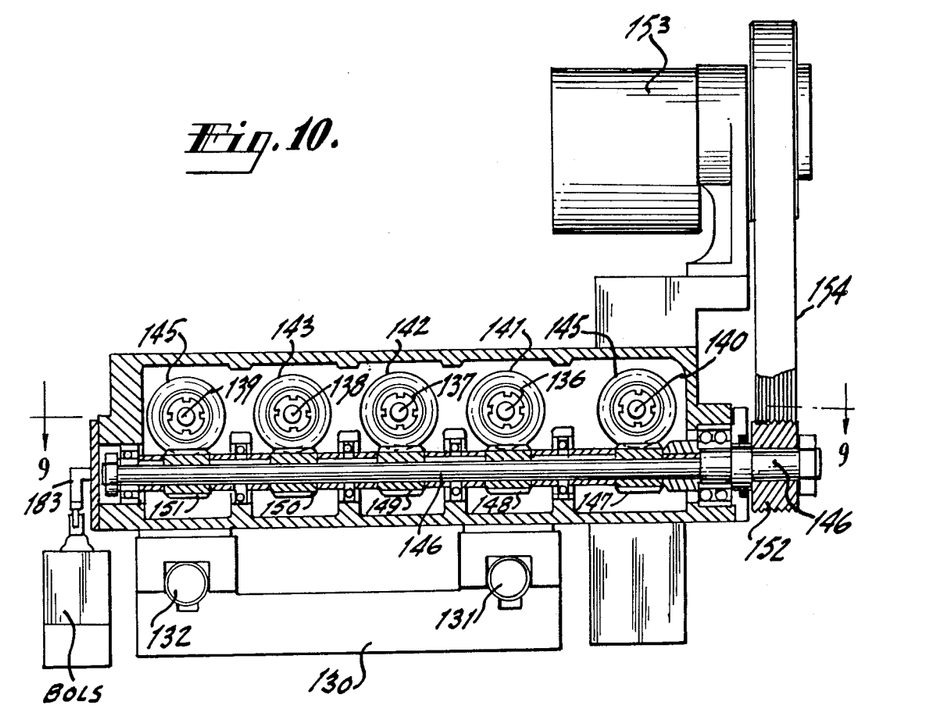
FIG. 10 is a section taken along the line 10—10 of FIG. 9.

Referring to FIGS. 8, 9 and 10 the tapping spindle assembly includes a base 130 supporting a pair of case shafts or guides 131 and 132. A tapping spindle assembly slide housing 133 is supported on guides 131 and 132 by means of ball bushing blocks 134 and 135 mounted on guide 131 and two others (not shown) mounted on guide 132.

Mounted within the housing 133 are a plurality of ball bearing supported tapping spindles 136, 137, 138 and 139. Also rotatably supported in housing 133 is the lead screw 140. The tapping spindles and lead screw 140 are provided with worm gears 141, 142, 143, 144 and 145 for driving the tappers and the lead screw to advance the tappers simultaneously at the proper rate of rotation to produce the desired pitch.

A worm shaft 146, has mounted thereon and secured thereto driving worm wheels 147, 148, 149, and 150 and 151. Shaft 146 is driven by pulley 152 connected to motor 153 by belt 154.

Mechanism is provided for rapidly moving the housing 133 and tapping spindles to initial working position and then starting tapping operations.

Mounted on guide 131 by means of ball bearing supported slide 156 is the non-rotatable lead screw nut 157. Also mounted on slide 156 is the bracket 158 carrying an adjustable stop screw 159. Contact between stop screw 159 and rest button 160 mounted on the base limits movement of the tapping assembly housing toward the work pieces. A hydraulic cylinder 161 is pivotally attached to the base 130 by yoke 162. The piston rod of hydraulic cylinder 161 is attached to slide 156 by means of bracket 158.

When the assembly is in its retracted position there is no contact between stop screw 159 and rest button 160. Also since slide 156 is connected to lead screw 140 by means of lead screw nut 157 action of hydraulic cylinder 161 will move the housing assembly between retracted position and starting position at any rapid desired speed depending upon speed of operation of the hydraulic cylinder.

When the stop screw 159 contacts stop button 160 on base 130, further movement of the housing toward the work pieces ceases. At this point rotation of the motor 153 begins causing rotation of the tappers and the lead screw to advance the housing 133 toward the work pieces. When tapping operations cease the tappers and lead screw are reversed with drawing the tappers and moving the housing to retracted position. Switches and controlling elements for these operations will be described below.

CIRCUIT AND CONTROLS FOR THE DRILLING ASSEMBLY

Figure 5:
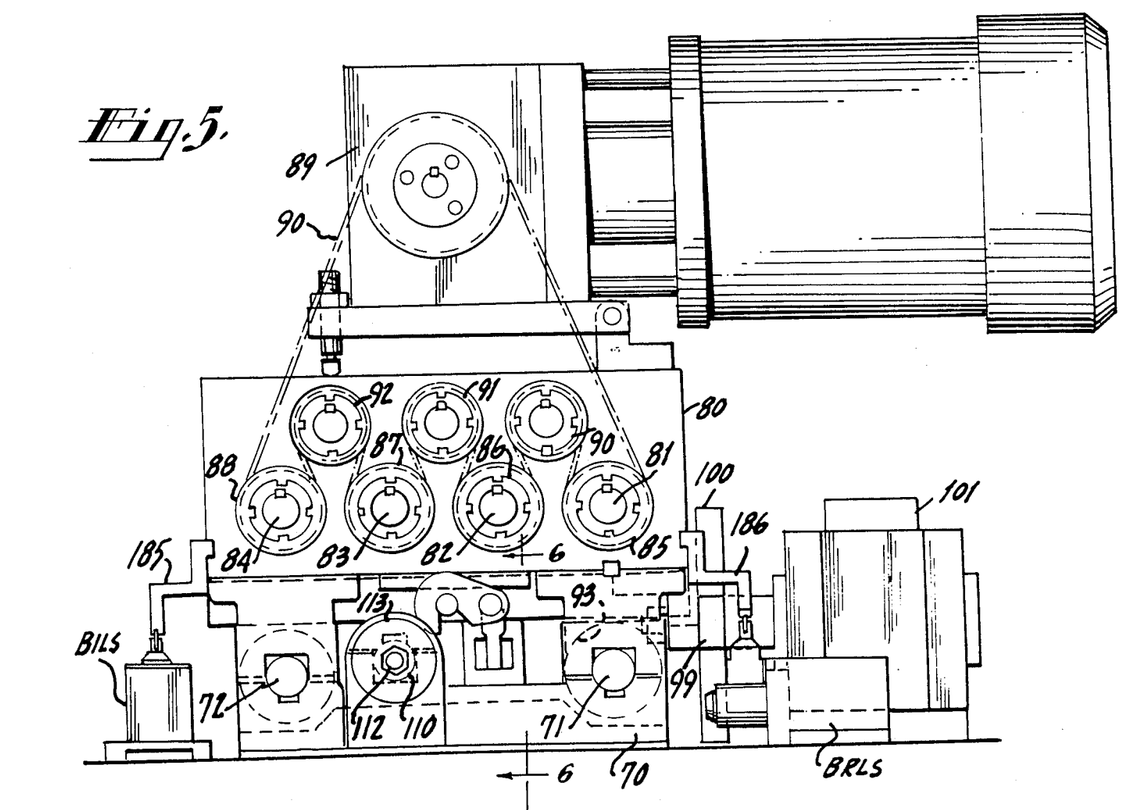
FIG. 5 is a left end view of FIG. 3.
Figure 11:
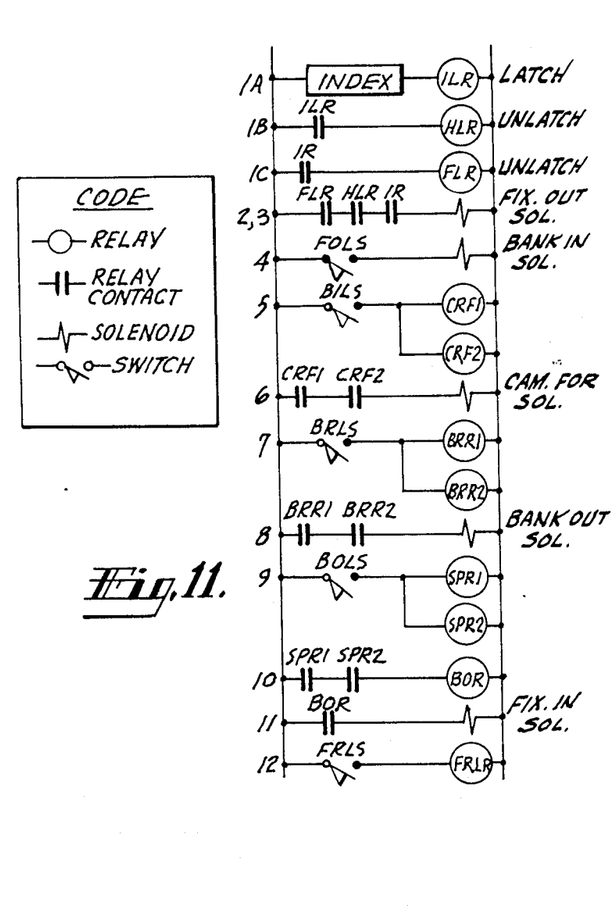
FIG. 11 is a schematic control circuit diagram for the drilling assembly as tied in with the indexing circuit.

Reference is made to FIGS. 4, 5 and 11. The mechanical trip switches as shown in these figures are identified by the same letter symbols. As the drilling assembly including the drill bushing sub-assembly and the drilling spindle sub-assembly moves toward and from operating positions, trippers activate the various switches for controlling relays and solenoids for energizing the hydraulic cylinders and motor governing the operation of the drilling sub-assemblies.

The drilling circuit operation is described below. The successive steps are indicated in the diagram shown in FIG. 11 by the numerals 1 to 12 on the left hand side of the diagram.

1. Table Turret Indexes
  A — During index cycle, relay ILR latches.
  B — ILR contact closes, energizing HLR unlatch coil.
  C — IR contact closes, energizing FLR unlatch coil.

2. FLR & HLR contacts close.
3. At end of index, IR contact closes, completing circuit to energize Fixture Out solenoid.
4. When the fixture reaches Out position it closes the FOLS switch, energizing Bank In solenoid.
5. When the bank (assembly) reaches In position BILS switch closes energizing CRF1 and CRF2 relays.
6. CRF1 & CRF2 contacts close, energizing Cam Forward solenoid.
7. The Cam causes the bank to move into the work pieces. When bank reaches maximum In position it closes BRLS switch energizing BRR1 and BRR2 relays.
8. BRR1 & BRR2 contacts close energizing Bank Out solenoid.
9. As bank reaches maximum Out position it contacts BOLS switch, energizing SPR1 & SPR2 relays.
10. SPR1 and SPR2 contacts close, energizing BOR relay.
11. BOR contact closes, energizing Fixture In solenoid.
12. As the fixture moves to In position, FRLS switch is contacted, which in turn energizes the FRLR latch relay thereby completing the index circuit.

The BILS switch is operated by the dog 185 carried on the bushing plate assembly 77. Switch BRLS is operated by the dog 186 carried on the drilling subassembly housing. Switch BOLS is also activated by dog 186.

CIRCUIT AND CONTROLS FOR THE TAPPING ASSEMBLY

Figure 12:
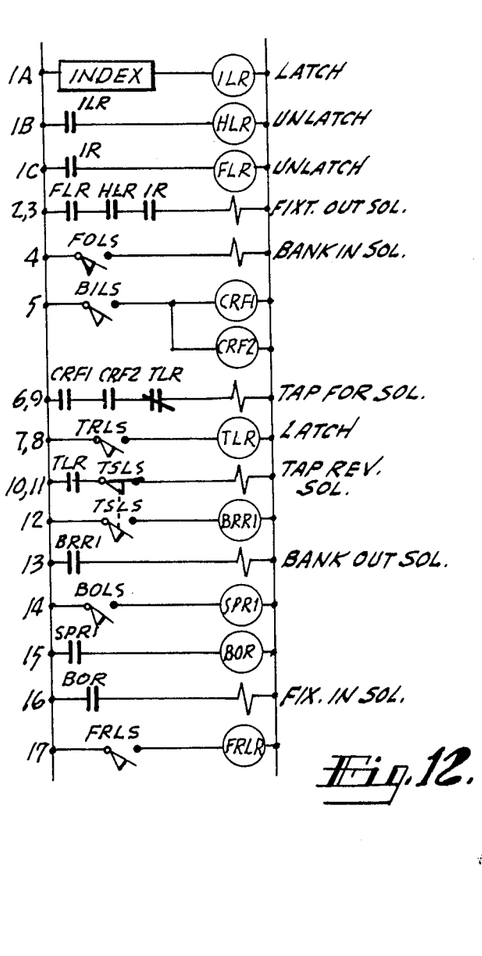
FIG. 12 is a schematic control circuit diagram for the tapping assembly as tied in with the indexing circuit.

Reference is made to FIGS. 8, 9 and 12.

The tapping operation is described below. The steps are indicated in FIG. 12 by the numerals 1 to 17 on the left hand side of the diagram.

1. Table Indexes
  A — During index cycle, relay ILR latches.
  B — ILR contact closes, energizing HLR unlatch coil.
  C — IR contact closes, energizing FLR unlatch coil.

2. FLR and HLR contacts close.
3. At end of index, IR contact closes, completing circuit to energize Fixture Out solenoid.
4. When the fixture reaches Out position the FOLS switch closes, energizing the Bank In solenoid.
5. When the bank (assembly) reaches In position BILS switch is closed, energizing CRF1 and CRF2 relays.
6. CRF1 and CRF2 contacts close, energizing the Tap Forward solenoid.
7. The Tap Forward solenoid causes the hydraulic motor to rotate the feed screw 140 which drives the taps into the work pieces.
8. As the taps reach maximum In position, the bank contacts the TRLS switch which energizes the TRL latch coil.

9. TLR contact opens deenergizing tap forward solenoid.

10. TLR contact closes energizing tap reverse solenoid.

11. Tap feed screw reverses until bank contacts TSLS switch which stops tap.

12. Other side of TSLS switch closes and energizes BRR1 relay.

13. BRR1 contacts close energizing the Bank Out solenoids.

14. As the bank reaches maximum Out position BOLS switch is closed energizing SPR1 relay.

15. SPR1 contacts close, energizing BOR relay.

16. BOR contact closes, energizing Fixture In solenoid.

17. As the fixture moves to In position the FRLS switch is contacted, which in turn energizes the FRLR latch relay thereby completing the index circuit.

The BILS switch is operated by the dog 180 mounted on slide 156. Switch TRLS is actuated by dog 181 mounted on the lead screw nut 157. Switch TSLS is actuated by the dog 182 mounted on the housing 133 and switch BOLS is actuated by the dog 183 also mounted on the housing 133.

What is claimed is:

1. Drilling and tapping apparatus for simultaneously drilling and tapping a plurality of work pieces at each of a plurality of positions and for simultaneously moving a plurality of work pieces from each of said plurality of positions to successive positions, including:
   a. a stationary table support having an opening therethrough;
   b. a plurality of banks of drilling and tapping tools supported on said table support at each of a plurality of angularly spaced apart working stations, each bank being mounted for movement between a non-working retracted position and a working position;
   c. a rotatable turret positioned in the opening within said table support;
   d. a plurality of work piece carrying shuttle and slide guide assemblies mounted on said turret at angularly spaced apart positions corresponding to the angular spacing between said banks, each shuttle being movable along its slide guide between a non-working retracted position and a working position relative to the respective bank on said table support;
   e. means for moving each shuttle from said non-working to said working position to move the work piece into working position;
   f. means for rotating said turret to move each shuttle and slide guide assembly into alignment with the tool banks at the next working station; and
   g. means for moving each bank of tools from its working to its non-working position simultaneously with movement of said work piece carrying shuttle from non-working to working position at the respective working station.

2. Drilling and tapping apparatus for simultaneously drilling and tapping a plurality of work pieces at each of a plurality of positions and for simultaneously moving a plurality of work pieces from each of said plurality of positions to successive positions, including:
   a. a stationary annular table support having a central opening therethrough;
   b. a plurality of banks of drilling and tapping tools supported on said table support at each of a plurality of angularly spaced apart working stations for simultaneously drilling and tapping holes in different surfaces of said work piece at the respective station, each bank being mounted for movement between a non-working retracted position and a working position;
   c. a rotatable turret positioned in the opening within said annular table support;
   d. a plurality of work piece carrying shuttle and guide assemblies mounted on said turret at angularly spaced apart positions corresponding to the angular spacing between said banks, each shuttle being movable along its slide guide between a non-working retracted position on said guides and a working position relative to the respective bank on said table support, each shuttle being adapted to removably support a work piece thereon;
   e. means for moving each shuttle from said non-working to said working position to move the work piece into working position;
   f. means for rotating said turret to move each shuttle and slide guide assembly into alignment with the tool banks at the next working station; and
   g. means for moving each bank of tools from its working to its non-working position simultaneously with movement of said work piece carrying shuttle from non-working to working position at the respective working station.

* * * * *